United States Patent [19]

Harrison

[11] E Re. 30,534

[45] Reissued Mar. 3, 1981

[54] ELECTRONIC FLASH INHIBIT ARRANGEMENT

[75] Inventor: George C. Harrison, Chelmsford, Mass.

[73] Assignee: Polaroid Corporation, Cambridge, Mass.

[21] Appl. No.: 85,499

[22] Filed: Oct. 17, 1979

Related U.S. Patent Documents

Reissue of:

[64] Patent No.: 4,162,836
Issued: Jul. 31, 1979
Appl. No.: 917,477
Filed: Jun. 21, 1978

[51] Int. Cl.[3] ..... G03B 3/10; G03B 15/05

[52] U.S. Cl. ..... 354/139; 354/145; 354/195

[58] Field of Search ..... 354/25, 32, 33, 34, 354/35, 60 F, 139, 145, 149, 195; 352/140

[56] References Cited

U.S. PATENT DOCUMENTS

| | | | |
|---|---|---|---|
| 3,522,764 | 8/1970 | Biber et al. | 354/195 |
| 3,810,212 | 5/1974 | Biber | 354/128 |
| 3,846,812 | 11/1974 | Biber | 354/145 |
| 4,001,639 | 1/1974 | Biber | 315/241 P |
| 4,064,519 | 12/1977 | Kee | 354/141 |
| 4,068,151 | 1/1978 | Harrison | 315/241 P |

OTHER PUBLICATIONS

U.S. Patent Application Ser. No. 729,289.
U.S. Patent Application Ser. No. 729,392.

*Primary Examiner*—Michael L. Gellner
*Attorney, Agent, or Firm*—Edward S. Roman

[57] ABSTRACT

Electronic flash apparatus for a camera having automatic focusing with sonic ranging has a charge control system which inhibits charging of the flash tube capacitor during at least the automatic focusing operation of the camera. The flash apparatus thus schedules capacitor charging to occur at times other than the sonic ranging for automatic focusing, and thereby avoids the likelihood that spurious radiation from the capacitor-charging oscillator interferes with the sonic ranging operation.

8 Claims, 4 Drawing Figures

ELECTRONIC FLASH INHIBIT ARRANGEMENT

Matter enclosed in heavy brackets [ ] appears in the original patent but forms no part of this reissue specification; matter printed in italics indicates the additions made by reissue.

CROSS-REFERENCE TO RELATED PATENT APPLICATION

This invention relates to U.S. Pat. application Ser. No. 889,251 for "Control System for Flash-Illuminated Automatic Focusing Camera", by G. Harrison, filed Mar. 23, 1978 in common assignment herewith.

BACKGROUND OF THE INVENTION

This invention relates to electrical apparatus for powering automatic camera equipment in a manner to avoid interference between camera operations. More particularly, the invention provides electrical control apparatus which limits the charging of a photographic flash capacitor to selected operating conditions when other interference-sensitive elements of the camera system are quiescent. The invention is described with particular reference to an electronic flash unit having control means which inhibits the charging operation when a sonic ranging device for automatic camera focusing is active.

Electronic flash units for photography are well known. The units conventionally have a battery-powered oscillator for producing alternating voltage which is rectified to charge a flash-powering storage capacitor. It is also known to control this capacitor-charging operation due to restrictions on the available battery power. The prior art on this subject includes U.S. Pat. Nos. 3,846,812; 4,001,639 and 4,064,519.

The advent of automatic focusing for cameras by sonic ranging raises the problem of a focusing malfunction due to interference with radiation from the flash unit. The focusing system emits sonic energy and positions the objective lens of the camera in response to reflections sensed from the object to be photographed. However, faulty ranging can occur when the focusing system picks up stray radiation from the capacitor-charging oscillator of the flash unit. The result of such faulty ranging operation is improper focusing of the objective lens of the camera and consequently an improperly focused photograph. It is understood that the interfering radiation is electromagnetic in nature.

The use of shielding to contain electromagnetic radiation from the flash-unit oscillator, and the use of selected frequency ranges for the ranging system and for the oscillator can diminish the interference problem, but recourse to these solutions tends to be costly. Moreover, the complete isolation of the ranging system from the capacitor-charging oscillator with either technique, so that the likelihood of a ranging malfunction is rendered negligible, is elusive to attain.

The prior art regarding automatic camera focusing includes U.S. Pat. No. 3,522,764, and commonly-assigned pending U.S. Pat. applications Ser. Nos. 729,289 for "Automatic Focusing Camera" by E. Shenk and Ser. No. 729,392 for "Ultrasonic Ranging System For Camera" by J. Muggli.

It is an object of this invention to provide apparatus for controlling photographic electronic flash equipment to operate without interference with sonic ranging for automatic camera focusing. To this end it is an object of the invention to provide photographic electronic flash equipment which responds to electrical signals available from an automatic sonic-focusing camera for controlling the capacitor-charging oscillator for operation without electromagnetic interference with the camera focusing operation. It is a further object of the invention to provide flash equipment-controlling apparatus of the above character which requires few components, and is otherwise comparatively low in cost.

A specific object of the invention is to provide a regulated photographic electronic flash unit incorporating control apparatus for operation without interfering with automatic camera focusing.

It is also an object of the invention to provide apparatus of the above character which operates with a minimum of operator attention or concern.

Other objects of the invention will in part be obvious and will in part appear hereinafter.

GENERAL DESCRIPTION

An electronic photographic flash unit embodying the invention has control elements which inhibit the flash unit oscillator from charging the storage capacitor during selected intervals of camera operation, including at least automatic focusing. The oscillator is thus quiescent, and emits no potentially-interfering radiation, either electrical or sonic, during the automatic focusing of the camera. The storage-capacitor in the flash unit normally is charged to the proper operating level prior to the start of the camera operating cycle, and retains sufficient charge during the inhibit interval to produce proper flash illumination.

The flash unit can inhibit the charging oscillator in response to signals available from the camera. This is particularly convenient where the camera operates with a cycle which is sufficiently automatic to produce a succession of control signals as the operating cycle proceeds. Alternatively, the flash unit can include a timer which initiates the inhibit interval in response to a single camera-signal and automatically terminates it at a later time. With the latter embodiment, the interval of the inhibit timer is sufficiently long to allow completion of at least the automatic focusing operation of the camera. Thereafter, in the absence of other constraints, the flash unit can be released to resume capacitor-charging operation, thereby to ensure that the storage capacitor is fully charged at the instant the camera sends the flash fire signal to the flash unit.

The invention accordingly comprises the features of construction, combinations of elements, and arrangements of parts exemplified in the constructions set forth below, and the claims indicate the scope of the invention.

DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

Figure 1:
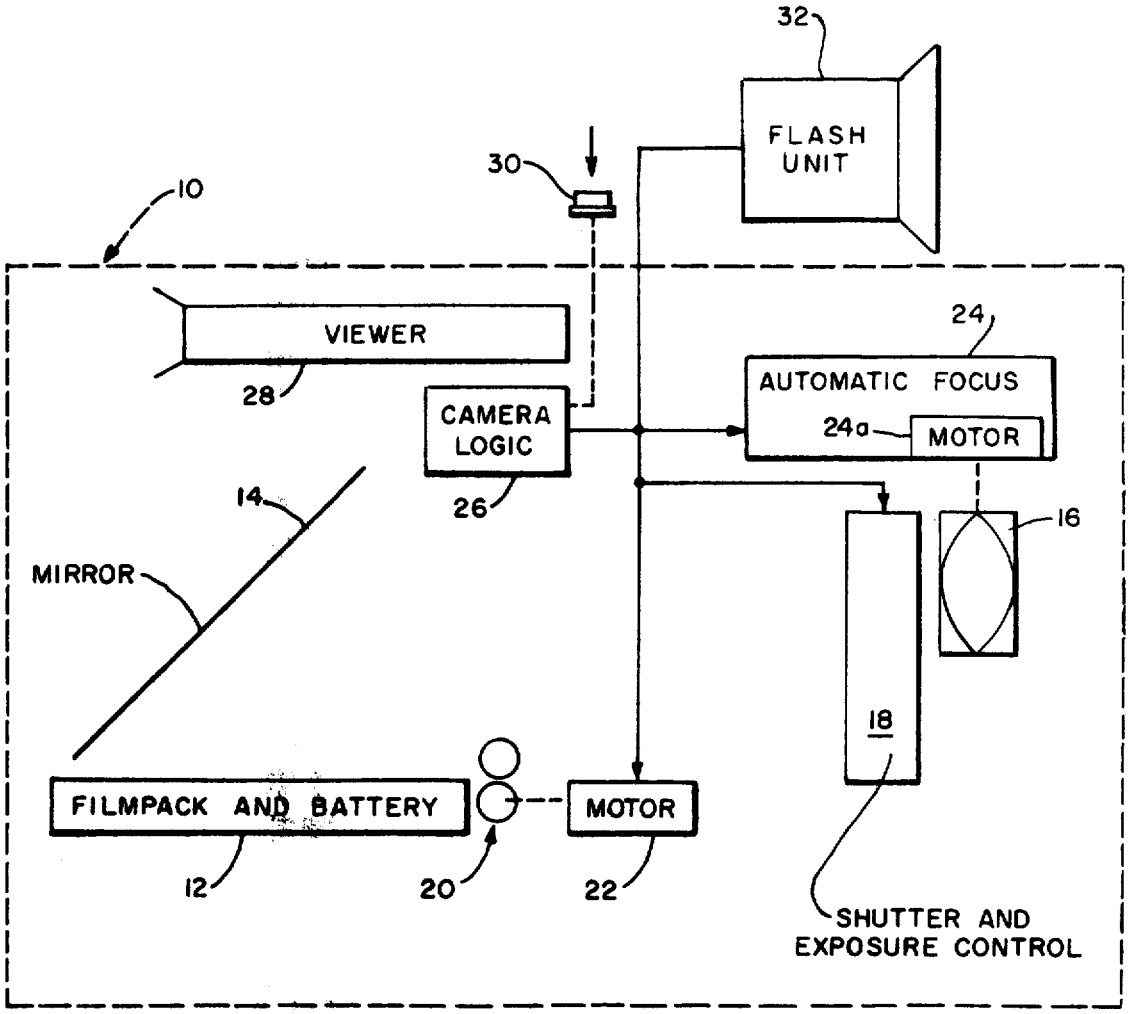
FIG. 1 shows in schematic form a camera with which the invention is used.

A camera 10 equipped with a charge control system in accordance with the invention has, as FIG. 1 diagrammatically shows, a film and battery pack 12 which presents one film unit therein at the image plane and in optical alignment with a mirror reflector 14 and a lens system 16. The lens system includes a variable focus objective lens. An exposure control system 18, including a shutter mechanism, is in optical alignment behind the lens system 16. A film transport mechanism, including a pair of spread rolls 20 and a transport motor 22, is arranged to transport an exposed film unit from the film pack 12 and draw it through the spread rolls before discharging it from the camera 10. The camera 10 also has an automatic focusing system 24 with a focusing motor 24a coupled to selectively focus the lens system 16. A camera logic unit 26 schedules the camera operations under power from the battery in the pack 12 when initiated by the shutter button 30. The camera also has a viewer 28.

The camera 10 is equipped with an electronic flash unit 32, which also operates in conjunction with the logic unit 26. The illustrated flash unit 32 has a regulated charge system and produces a fixed, known quantity of light, and the illustrated camera 10 adjusts the exposure control system 18 for proper film exposure in accordance with the distance to the object being photographed as provided by the automatic ranging elements of the focus system 24. The illustrated camera thus exposes film with a non-automatic strobe or flash unit using a so-called follow-focus exposure control system.

In a camera 10 where the viewer 28 is a simple viewfinder, the operator can view the subject to be photographed independent of the focus condition of the camera. Thus, when the operator has the scene to be photographed properly in view, s/he depresses the shutter button to initiate a camera operating cycle, controlled by the logic unit 26 and the flash unit 32, in which the camera automatically focuses on the subject in the center of the viewfinder, exposes a film unit with flash illumination, and transports the exposed film unit from the film pack through the rollers and discharges it from the camera. Aside from the automatic focusing system 24 and the flash unit 32, the structure and operation of the camera 10 where the viewer 28 is a simple viewfinder can be the same as found in a commercially available PRONTO! brand camera marketed by the Polaroid Corporation. Accordingly, these elements of the camera 10 are not described further.

The automatic focusing system 24 can be constructed as described in the above-noted U.S. Pat. No. 3,522,764 and U.S. Pat. applications Ser. Nos. 729,289 and 729,392. As the noted patent describes, it emits sonic energy with an ultrasonic frequency, and senses reflections from the center of the camera field of view. Electrical circuits develop a ranging signal in response to the sensed sonic energy and drive the focusing motor to focus the lens systems on the object that reflected the sonic energy. Such a system, however, can be subject to interference from the stray radiation which a flash-unit oscillator typically produces. When this occurs, the system develops a faulty ranging signal, and consequently the camera lens is focused at an incorrect image distance. The flash unit 32 which the invention provides, however, is quiescent during the automatic focusing, and hence the camera system of FIG. 1 is free of this problem.

Figure 2:
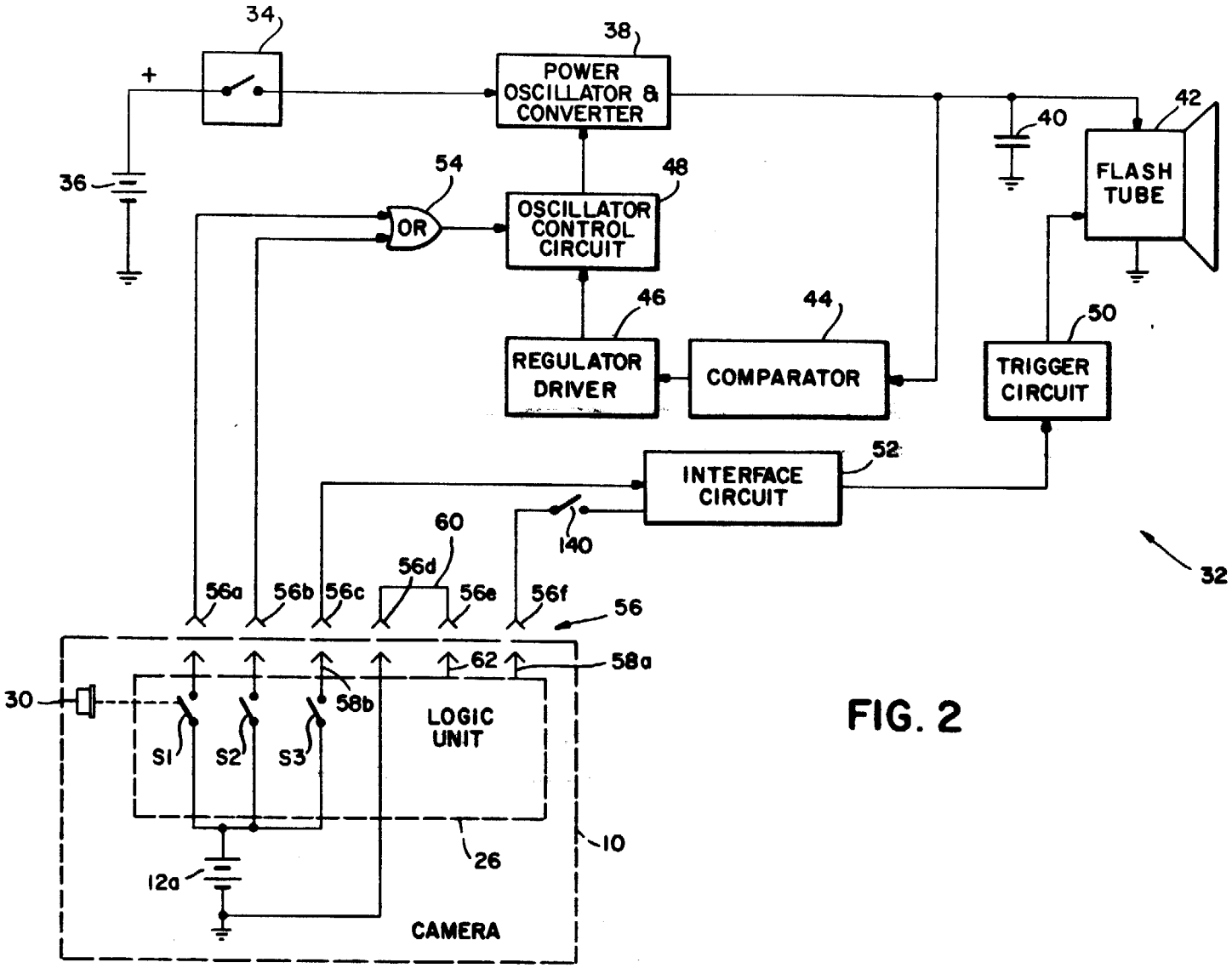
FIG. 2 is a block schematic diagram of a charge control system according to the invention.
Figure 3:
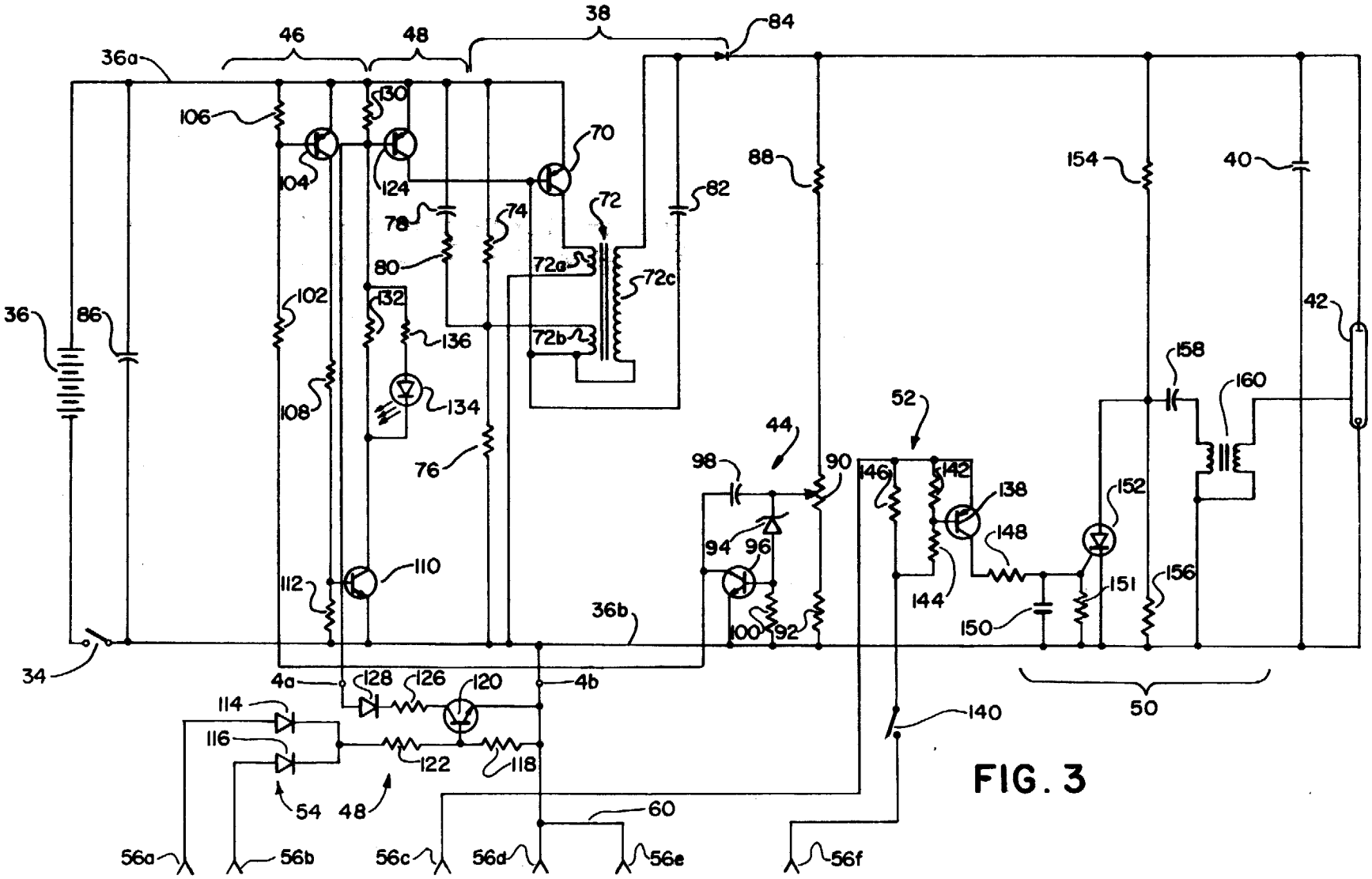
FIG. 3 is a more detailed schematic diagram of the charge control system of FIG. 2.

FIGS. 2 and 3 show a flash unit 32 connected with a viewfinder camera 10 operating in the foregoing manner. As shown schematically in FIG. 2, the flash unit 32 is activated with a normally-open on-off switch 34 that closes to energize a power oscillator and converter 38 from a flash battery 36. The power converter 38 develops a high direct voltage which it applies to an energy storage capacitor 40 connected in parallel with a flash tube 42. The charge control system also has a comparator 44 that compares a known portion of the voltage across the storage capacitor 40 with a reference voltage. A normally-inactive regulator driver 46 responds to the signal the comparator produces when the storage capacitor voltage attains a desired level to activate an oscillator control circuit 48. The control circuit 48 is normally inactive, but when activated by the regulator driver 46, it disables the oscillator of the power converter 38. The converter then stops charging the capacitor 40. Moreover, the flash unit produces no stray radiation, either electromagnetic or sonic, when the oscillator is disabled.

A trigger circuit 50 responds to a flash pulse from the camera, applied through an interface circuit 52, to initiate conduction in the flash tube 42. The flash tube then dissipates the charge stored in capacitor 40 and produces a bright flash of illumination for the camera.

The oscillator control circuit 48 is also activated to switch off the power converter 38 by an assertive signal from an OR gate 54, which is connected to switches within the camera 10 logic unit 26.

FIG. 2 also shows that the flash unit 32 plugs by way of a connector 56 onto the camera 10. The connector 56 interconnects the flash unit with the camera logic unit 26 for applying, by way of conductors 58a and 58b, the flash pulse from the camera logic unit to the trigger circuit 50, by way of the interface circuit 52. In the illustrated embodiment, a camera switch S3 applies one side of the battery 12a to the conductor 58b for an interval that includes the camera exposure time. The camera logic unit switches the conductor 58a to the other side of the camera battery at the proper time to produce the flash illumination synchronized with film exposure. The illustrated arrangement also includes a conductive jumper 60 within the flash unit which, by way of the connector 56, connects one side of the camera battery 12a to the camera logic unit 26 via a conductor 62, thereby signalling the logic unit that the flash unit is plugged onto the camera.

The illustrated camera also has two other switches S1 and S2 which apply signals, by way of connector 56, to the flash unit. The signals are applied to the OR circuit 54 to inhibit operation of the power oscillator and converter 38 and thereby to preclude electrical interference with the camera automatic focus system 24 during selected portions of the camera operating cycle. The net effect of the two switches S1 and S2 is to ensure that the OR circuit 54 receives at least one assertive signal throughout at least the automatic focusing operation of the camera cycle. The OR circuit in response disables the capacitor-charging power oscillator during this camera operation. More particularly, in the illustrated embodiment, switch S1 closes upon depression of the shutter button 30 and remains closed only as long as the operator depresses the shutter button. The switch S2 applies an assertive signal to the flash unit 32 during operation of the camera focus mechanism 24. The switch S2 automatically closes, after the shutter button is depressed, in response to the camera lens system being moved from the rest position and remains closed until the automatic focus mechanism returns the lens system 16 to the rest position. (The lens system 16 is only in the rest position when the camera is not in an operating condition; that is, no pictures are taken with the lens in the rest position.)

The operation of the elements described in FIG. 2 commences when the user turns on the flash unit 32 by closing switch 34, which is normally open. The closed switch 34 applies the battery 36 voltage to the power oscillator and converter 38, which commences charging the storage capacitor 40. When the comparator 44 signals that the voltage across the storage capacitor 40 has attained the desired level, the regulator driver 46 activates the oscillator control circuit 48 to terminate further operation of the power converter 38.

While the operator maintains the on/off switch 34 closed, but does not depress the camera shutter button 30, the capacitor 40 charge begins to dissipate from the selected level. When it drops to a lower threshold level, the comparator 44 no longer activates the regulator driver, and the control circuit becomes inactive. The power converter 38 then resumes operation and recharges the storage capacitor quickly to the desired level, at which point it is again disabled by the comparator 44, the driver 46 and the control circuit 48. The power converter 38, comparator 44, driver 46, and control circuit 48 thus operate as a discretely regulated d.c. to d.c. power converter, and maintain the capacitor, once it is charged, within a selected voltage of the desired charge level. The regulation operates with discrete on and off conditions.

When the user presses the shutter button 30 while the flash unit switch 34 is closed, the resultant closures of switches S1 and S2 activate the control circuit 48 to disable the power oscillator and converter. With the oscillator thus turned off, the flash unit produces no significant radiation that can interfere with the focus system of the camera. Switch S3 is also closed in response to pressing the shutter button 30. After closure of at least switch S1, the camera activates the sonic focusing system 24, FIG. 1, and then produces the flash fire signal while operating the exposure unit 18. The trigger circuit responds to the flash signal to fire the flash tube from the charged capacitor 40 during the film exposure. The illustrated camera control unit 26 then activates the transport motor 20, and finally resets the automatic focus system 24. These latter actions open switches S2 and S3. When the user also has released the shutter button so that switch S1 opens, the flash unit will again charge the capacitor 40 in preparation for another exposure. Release of the flash unit switch 34, however, terminates all charging operation.

FIG. 3 shows a preferred flash unit circuit for the charge control system of FIG. 2. The on-off switch 34 applies the battery 36 voltage to the converter 38, which employs a transistor 70 with the emitter-collector path in series with the primary winding 72a of a step-up transformer 72. The transformer has a feedback winding 72b between the transistor base and a voltage divider formed by fixed resistors 74 and 76. The series combination of a capacitor 78 and resistor 80 is connected between the positive battery voltage and the interconnection of the feedback winding with the voltage divider resistors. The circuit develops a stepped-up alternating voltage across the transformer 72 secondary winding 72c, across which a capacitor 82 is connected, and a diode 84 rectifies this output voltage to develop the converter 38 output direct voltage.

The energy storage capacitor 40 receives the high direct voltage output from the converter 38 and applies it across the terminals of the camera flash tube 42. This power converter 38 is similar to that described in U.S. Pat. No. 4,068,151, to which reference should be had for further details. A capacitor 86 is connected between the positive battery line 36a and the return path 36b in the flash unit to increase the charge system efficiency by supplying peak currents for the power converter 38. It also suppresses electronic noise.

The illustrated comparator 44 (FIG. 2) is constructed with a series combination of fixed resistor 88, potentiometer 90, and fixed resistor 92 forming a voltage divider in parallel with the energy storage capacitor 40. The potentiometer tap applies a known portion of the voltage across the capacitor 40 to the cathode of a zener diode 94, the anode of which is connected to the base of a transistor 96. A capacitor 98 is connected between the transistor collector and the zener cathode, and a resistor 100 is connected between the base and the d.c. return or ground path, to which the transistor emitter is connected. U.S. Pat. No. 4,068,151 for "Regulated Strobe with Hysteresis" describes the operation of this comparator 44 construction.

The signal which the comparator transistor 96 develops at the collector, which is the comparator 44 output signal, is applied through a series resistor 102 to the base of a transistor 104. A resistor 106 is connected between the transistor base and the positive battery voltage. The emitter is connected to the positive battery line 36a, and the transistor collector is connected through a resistor 108 to the base of a transistor 110. A resistor 112 is connected between the transistor 110 base and the return path. The transistors 104 and associated resistors constitute the regulator driver 46 of FIG. 2.

With further reference to FIG. 3, the OR circuit 54 of FIG. 2 employs two logic diodes 114 and 116 connected respectively to apply the signals from switches S1 and S2 to the base of a transistor 120 through current-limiting resistor 122. A resistor 118 is connected between the transistor base and the flash unit return conductor. Transistor 120 and a further transistor 124 constitute the FIG. 2 control circuit 48. A resistor 126 and isolating diode 128 couple the collector of transistor 120 to the base of transistor 124. The transistor 124 emitter is connected to the battery line 36a, and a resistor 130 is between the base and that line. The emitter-collector path of transistor 124 is thus in parallel with the emitter-base junction of the oscillator and converter transistor 70, such that when the transistor 124 is conducting it in effect shunts the converter transistor 70.

The base of transistor 124 is direct-coupled through resistor 132 to the collector of transistor 110. A flash-ready indicator is also provided by a light-emitting diode 134 and series limiting resistor 136 in parallel with resistor 132.

The interface circuit 52 of FIG. 2 enables the flash unit 32 to be connected for operation with circuits of the camera 10. The illustrated interface construction shown in FIG. 3 employs a transistor 138 with the emitter connected to the connector terminal 56c. The switch 140 is preferably operated with the flash unit on-off switch to present a high impedance to the camera at terminal 56f when the flash unit is OFF. The transistor base is connected to the interconnection of resistors 142 and 144 and the resistor 144 is connected in series with the switch 140 to the connector terminal 56f that receives the flash fire signal. A resistor 146 is in parallel with the two resistors 142 and 144.

The flash-initiating signal which transistor 138 develops at the collector is applied through a series resistor 148 and across a shunt capacitor 150 and resistor 151 to the gate of a silicon controlled rectifier 152. The SCR 152 is arranged with the capacitor 150 and resistor 151 in a conventional trigger stage, with the cathode connected to the return line. The SCR anode is connected to the interconnection of a voltage divider formed with resistors 154 and 156 and which is in parallel with the energy storage capacitor 40, and is connected through a series coupling capacitor 158 to the primary winding of a trigger transformer 160. The transformer 160 secondary winding is connected to the trigger electrode of the flash tube 42.

The circuit of FIG. 3 converts the relatively low, for example six volt, voltage of the flash unit battery 36 to a significantly higher d.c. voltage, for example having a value in excess of three hundred volts, which it applies across the energy storage capacitor 40. During the initial charging operation all transistors other than the power oscillator and converter transistor 70 are non-conducting. When the voltage across the storage capacitor 40 attains the desired maximum level and zener diode 94 conducts, transistor 96 begins conducting. The resultant voltage drop at the collector of that transistor biases transistor 104 ON. The emitter-base conduction in transistor 104 switches transistor 110 ON, which in turn switches transistor 124 ON. The resultant low emitter-collector impedance of transistor 124 in effect short circuits the oscillator transistor 70 to terminate further operation of the converter. The charging of the storage capacitor 40 hence stops at the level which initiated transistor 96 conduction. When the discharge of capacitor 98 in the comparator 44 and the discharge of the main energy storage capacitor 40 cause the comparator transistor 96 to decrease in conduction, transistor 124 is switched to the non-conductive state through transistors 104 and 110, thereby releasing the power converter to recharge the storage capacitor 40 to the specified level. The power converter now operates in a regulating mode, repetitively switching ON and OFF to maintain the desired charge across the storage capacitor 40.

When the camera control unit 26 applies a flash pulse to connector terminal 56f, conduction through resistor 146 in the interface circuit 52 develops a voltage drop across the voltage divider resistors 142 and 144 and hence biases transistor 138 to conduction. The resultant pulse on the transistor collector, which is referenced to the camera battery ground through connector terminal 56d, initiates conduction in the SCR 152. The trigger circuit then initiates photograph-illuminating flash conduction with the energy stored in capacitor 40.

The camera logic unit 26 produces the flash pulse only when the user depresses the shutter button 30 which, as described, results in the closure of the camera switches S1, S2 and S3. Closure of switches S1 and S2 biases diodes 114 and 116, respectively, of the OR circuit 54 to conduct, which biases transistor 120 to conduct. This turns ON transistor 124, which turns off transistor 70 so that the capacitor charging operation halts. The oscillator and converter 38 thereby remains inactive during the ensuing automatic ranging and focusing operation. In the illustrated embodiment of FIGS. 2 and 3, where camera switch S2 remains closed until the camera lens returns to the at-rest position at the end of the camera cycle, the flash unit charge system remains disabled for the same interval. With most cameras, especially cameras other than of the single reflex type, this interval is so short that the storage capacitor readily retains sufficient charge to provide ample power for the flash illumination.

The charge control system of FIGS. 2 and 3 thus charges the energy storage capacitor to a selected level and regulates the capacitor charge at that level. The system responds to a camera flash pulse to fire the flash tube from the charged storage capacitor. However, the system disables the power oscillator and converter throughout at least the camera cycle step of automatic ranging and focusing. That operation consequently proceeds without interference from any electromagnetic or sonic radiation from the oscillating operation of the flash unit converter 38.

The invention can also be practiced by inhibiting the flash unit oscillator only during the automatic ranging step of camera operation, and hence allow flash unit charging during subsequent camera operations. This sequence can be particularly useful with an automatically-focusing SLR camera such as the Polaroid Corporation Sonar SX-70 One Step Camera. With such a camera, the image the user sees is in focus only when the camera objective lens is focused. Hence the user needs a brief interval, usually measured in fractions of a second, between the automatic focusing operation and the exposure operation in which to frame and preview the scene to be photographed. Resumption of flash charging immediately after the automatic focusing is hence desirable to ensure that the flash capacitor is fully charged at the post-previewing time when exposure takes place. The resumption of flash unit-charging after autofocusing can be done, for example, with the arrangement of FIGS. 2 and 3 simply by actuating the flash unit OR circuit 54 only during the brief interval of automatic ranging.

Figure 4:
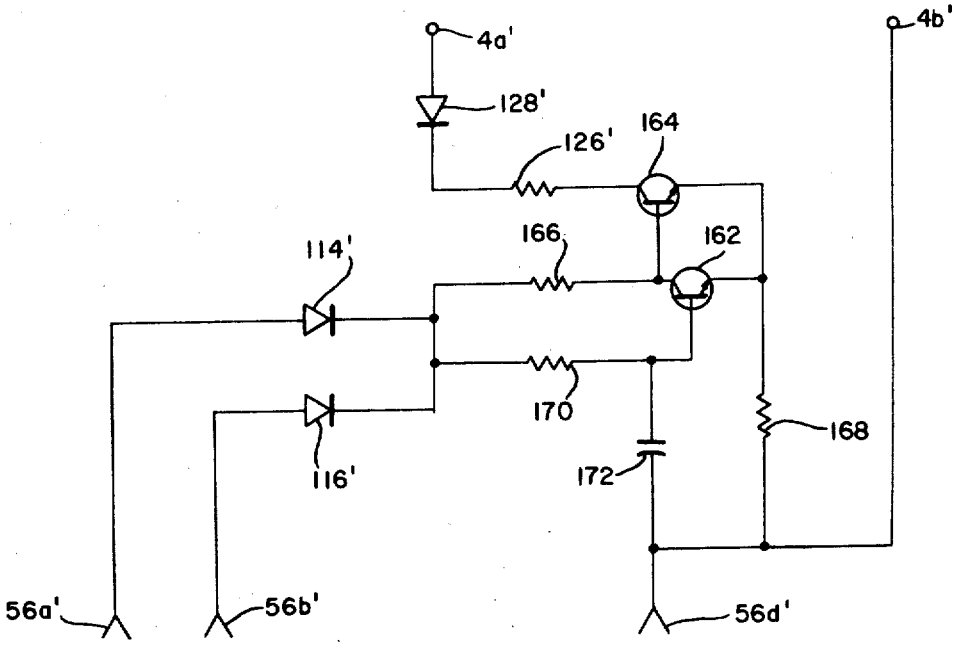
FIG. 4 is a partial schematic diagram of another charge control system according to the invention.

Alternatively, the flash unit can employ a timing circuit to limit the inhibit duration, and FIG. 4 shows such a timing circuit. (Elements of FIG. 4 which corresponds to elements of any prior figure bear the same reference numeral with a superscript prime.) The timing circuit of FIG. 4 is connected to charge control system of the FIG. 3 flash unit 32 at the FIG. 3 terminal 56a, 56b and 56d and at the connection points 4a and 4b. It hence replaces the the FIG. 3 elements 114, 116, 118, 120, 122, 126 and 128.

In place of these elements, the timing circuit has diodes 114′ and 116′ connected to the terminals 56a′ and 56b′, and employs two transistors 162 and 164. The collector of transistor 164 is connected through limiting resistor 126′ and isolating diode 128′ to connection point 4a′. The base of that transistor is connected directly to the collector of transistor 162, and a resistor 166 is connected between the base and the interconnected cathodes of diodes 114′ and 116′. A resistor 168 is connected between the transistor 162 emitter and the return path provided at terminal 56d′ and point 4b′. A resistor 170 is connected between the diode cathodes and transistor 162 base, and a timing capacitor 172 is connected from the base to the return conductor.

The diodes 114′ and 116′, like the corresponding diodes in FIG. 3, supply operating power to the flash-unit transistor to which they connect. Hence, in the absence of camera voltage at either terminal 56a′ or 56b', both transistors 162 and 164 are nonconducting and capacitor 172 is discharged. However, upon closure of camera switch S1, diode 114' applies the power from the camera battery to both transistors, and transistor 164 becomes conductive. The current path through the collector emitter junction drives the FIG. 3 transistor 124 to conduction, which disables the oscillator transistor 70. The initially discharged capacitor 172, however, holds transistor 162 non-conductive for a timing interval determined by resistor 170 and the capacitor. When the capacitor voltage charges through resistor 170 to the point where it exceeds the reference voltage across resistor 168 sufficiently to switch transistor 162 ON, the drop in collector voltage at the latter transistor drives transistor 164 OFF. The FIG. 3 transistor 124 then ceases conduction and transistor 70 resumes capacitor-charging operation.

Transistor 162 continues conducting, thereby biasing transistor 164 OFF, so long as any one of the camera switches S1 and S2 is closed to apply power from the camera battery. In this manner, the timing circuit of FIG. 4, with very few additional components, provides an electronic flash unit which is disabled only during the very brief interval of automatic camera ranging.

The invention thus provides an electronic flash unit for a sonically-ranging auto-focus camera. The flash units responds to one or more signals available from the camera to inhibit flash-charging oscillator elements that are potential sources of interference with the sonic ranging operation of the auto-focus system. The flash unit remains fully active until disabled in response to camera signals that mark the start of the auto-focus operation. In one embodiment the flash unit thereafter remains disabled from charging the flash-powering capacitor until the camera signals terminate. A second embodiment provides a separate inhibit timer that releases the flash unit from the inhibit mode after a selected interval. With both embodiments, the inhibit operation does not detract from the charge on the flash unit capacitor, so that it remains sufficient for full flash illumination for a significant interval after the onset of the inhibit.

The flash unit which the invention provides thus leaves the camera with which it is used free for accurate automatic sonic ranging and focusing without the potential of interference from the flash unit.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings be interpreted as illustrative and not in a limiting sense. As one example, although illustrated with a flash unit having a battery separate from the camera battery, a flash unit embodying the invention can be powered from the camera battery. As a further example, the invention can be practiced by those skilled in the art with a flash unit having a non-regulated charge control system.

Further, the following claims are intended to cover all of the generic and specific features of the invention herein described, and all statements of the scope of the invention which as a matter of language might be said to fall therebetween.

Having described the invention, what is claimed as new and secured by Letters Patent is:

1. Electronic flash apparatus for use with a camera of the type having a variable focus objective lens and having automatic focusing means with ranging means for the automatic focusing of the objective lens, electrically-energizable camera control means responsive to manual actuation for automatically operating the ranging means for driving the objective lens to a focus position with respect to a scene to be photographed, and means for providing a camera signal commencing in response to the manual actuation of the control means and not later than the automatic focusing operation, and wherein the camera focusing means is subject to detrimental interference from spurious electromagnetic radiation, said electronic flash apparatus having an energy-storage capacitor and a flash-discharge tube, charging means energizable by an applied supply voltage for producing an alternating voltage and a direct voltage in response thereto, and for charging the capacitor with the direct voltage, means responsive to a flash fire signal from the camera for discharging the capacitor through the flash tube, and further comprising control means responsive to said camera signal for disabling said charging means from producing said alternating voltage, so that the flash apparatus is disabled from producing spurious electromagnetic radiation, during at least the operation of the camera focusing means.

2. Electronic flash apparatus as defined in claim 1 further comprising circuit means for disabling said control means from producing said alternating voltage only during the presence of a camera signal.

3. Electronic flash apparatus as defined in claim 1 further comprising timing circuit means for disabling said control means from producing said alternating voltage for a selected interval following initiation of said camera signal.

4. Electronic flash apparatus as defined in claim 1 for use with a camera having a battery and further comprising a flash battery separate from the camera battery and for powering the charging means, and an input stage of said control means which receives said camera signal, said input stage being powered from the camera battery by means of said camera signal.

5. Electronic flash apparatus for use with a camera of the type having a variable focus objective lens and having sonic ranging and focusing means for the automatic focusing of the objective lens, electrically-energizable camera control means responsive to manual actuation for automatically operating the ranging means for driving the objective lens from an initial at-rest position to a focus position with respect to the scene to be photographed, and for automatically returning the objective lens to the initial at-rest position, an electrical connector together with means for providing at the connector at first signal commencing in response to the manual actuation of the energizable camera control means, and a second signal commencing in response to the objective lens being automatically driven from its initial at-rest position and terminating in response to the objective lens being returned to the at-rest position, and a flash fire signal, wherein the camera ranging and focusing means is subject to malfunction by interference from spurious electromagnetic radiation, said electronic flash apparatus having a flash-discharge tube, an energy-storage capacitor, an electrical connector complementary to the camera connector for releasable connection therewith, means energizable by an applied supply voltage for producing an alternating voltage and a direct voltage in response thereto, and for charging the capacitor with the direct voltage to a select level and for thereafter maintaining the capacitor voltage within select limits, means responsive to the flash fire signal for discharging said capacitor through said discharge tube to produce an illuminating flash of light, and further comprising control means responsive to the first signal to occur of said first and second signals from the camera for disabling said charging means from charging said capacitor so as to terminate production of the alternating voltage, and correspondingly of spurious electromagnetic radiation, during at least the operation of the camera ranging and focusing means.

6. Electronic flash apparatus for use with a single-lens reflex camera of the type having a variable focus objective lens through which the user frames a scene to be photographed and having sonic ranging and focusing means for the automatic focusing of the objective lens, electrically-energizable camera control means responsive to manual actuation for automatically operating the ranging means for driving the objective lens from an initial at-rest position to a focus position with respect to the scene to be photographed, and for automatically returning the objective lens to the initial at-rest position, an electrical connector together with means for providing at the connector a first signal commencing in response to the manual actuation of the energizable camera control means, and a second signal commencing in response to the objective lens being automatically driven from its initial at-rest position and terminating in response to the objective lens being returned to the at-rest position, and a flash fire signal, and wherein the camera ranging and focusing means is subject to malfunction by interference from spurious electromagnetic radiation, said electronic flash apparatus having a flash-discharge tube, an energy-storage capacitor, an electrical connector complementary to the camera connector for releasable connection therewith, means energizable by an applied supply voltage for producing an alternating voltage and a direct voltage in response thereto, and for charging the capacitor with the direct voltage to a select level and for thereafter maintaining the capacitor voltage within select limits, means responsive to the flash fire signal for discharging said capacitor through said discharge tube to produce an illuminating flash of light, and further comprising control means responsive to the first signal to occur of said first and second signals from the camera for disabling said charging means for a selected time only from charging said capacitor so as to terminate production of the alternating voltage, and correspondingly of spurious electromagnetic radiation, during at least the operation of the camera ranging and focusing means, said control means thereafter enabling said charging means to again charge said capacitor for the interval between termination of said selected time and the last signal to occur of said first and second signals.

*7. Electronic flash apparatus for use with a camera of the type having automatic ranging means, electrically-energizable camera control means responsive to manual actuation for automatically operating the ranging means, and means for providing a camera signal commencing in response to the manual actuation of the control means, and wherein the camera ranging means is subject to detrimental interference from spurious electromagnetic radiation,*

*said electronic flash apparatus having*

*an energy-storage capacitor and a flash-discharge tube charging means energizable by an applied supply voltage for producing an alternating voltage and a direct voltage in response thereto, and for charging the capacitor with the direct voltage,*

*means responsive to a flash fire signal from the camera for discharging the capacitor through the flash tube, and further comprising*

*control means responsive to said camera signal for disabling said charging means from producing said alternating voltage, so that the flash apparatus is disabled from producing spurious electromagnetic radiation, during at least the operation of the camera ranging means.*

*8. The apparatus of claim 7 wherein the automatic ranging means ranges by way of a sonic signal.*

* * * * *